United States Patent [19]
Engelsberger et al.

[11] 4,428,157
[45] Jan. 31, 1984

[54] DOOR ESPECIALLY FOR MOTOR VEHICLES

[75] Inventors: Ernst Engelsberger, Glonn; Ralf-Thilo Schulz, Putzbrunn; Franz Drachenberg, Baldham, all of Fed. Rep. of Germany

[73] Assignee: Messerschmitt-Boelkow-Blohm GmbH, Munich, Fed. Rep. of Germany

[21] Appl. No.: 334,640

[22] Filed: Dec. 28, 1981

[30] Foreign Application Priority Data

Jan. 24, 1981 [DE] Fed. Rep. of Germany ....... 3102329

[51] Int. Cl.³ .............................................. B60J 5/04
[52] U.S. Cl. .................................................... 49/502
[58] Field of Search ........................ 49/502, 503, 501; 296/146

[56] References Cited

U.S. PATENT DOCUMENTS

| | | | |
|---|---|---|---|
| 3,300,901 | 1/1967 | Eckel | 49/502 |
| 3,782,036 | 1/1974 | Clark et al. | 49/502 |
| 3,868,141 | 2/1975 | Johnson | 49/502 X |
| 4,290,235 | 9/1981 | Jahnle et al. | 49/502 |
| 4,328,642 | 5/1982 | Presto | 49/502 |

*Primary Examiner*—Philip C. Kannan
*Attorney, Agent, or Firm*—W. G. Fasse; D. H. Kane, Jr.

[57] ABSTRACT

The present door, such as a motor vehicle door, has a central member extending from the hinges to the lock. The central member carries an interior and an exterior door panel. The central member is a body of compound synthetic hard foam material having embedded therein an energy absorbing element. Additionally, the central member is encased in two shells. This structure is lightweight and yet stiff against shearing and torsion loads as well as impact forces.

7 Claims, 1 Drawing Figure

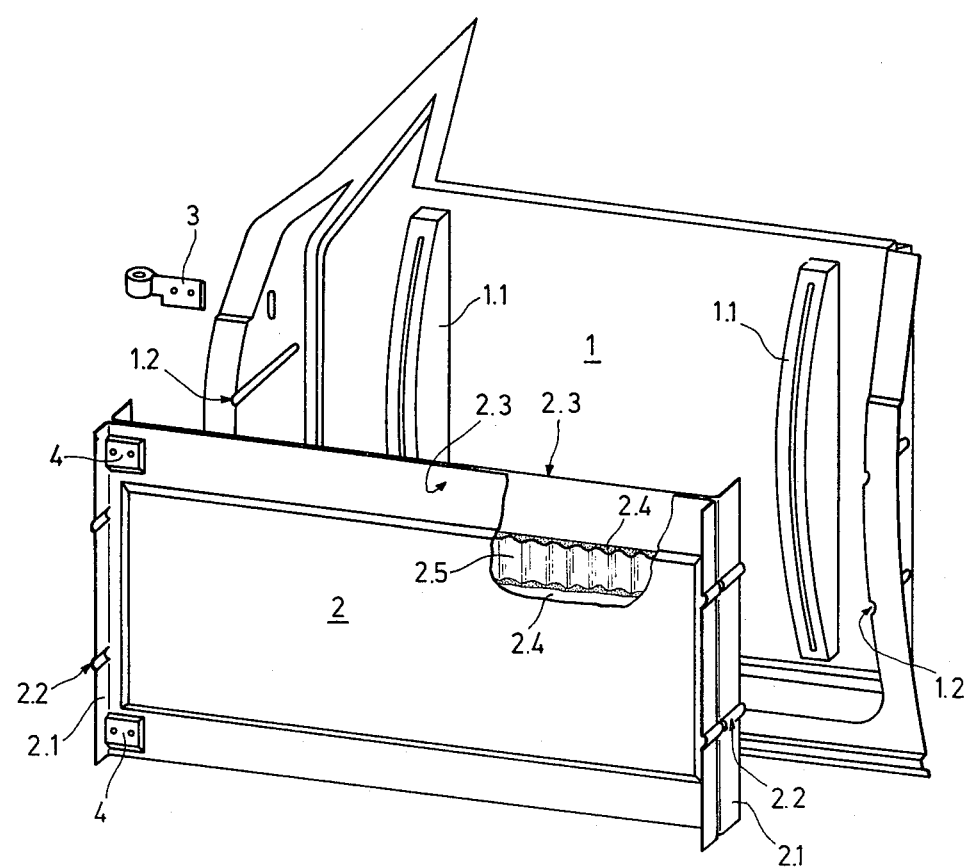

DOOR ESPECIALLY FOR MOTOR VEHICLES

CROSS-REFERENCE TO RELATED APPLICATIONS

The present application is based on German Serial Number P 3,102,329.0, filed in the Federal Republic of Germany on Jan. 24, 1981. The priority of the German filing date is claimed for the present application.

BACKGROUND OF THE INVENTION

The present invention relates to a door especially to a door for motor vehicles. In such a door a central core extends between the door hinges and the door lock and forms a carrier for the interior and exterior door means such as door panels. German Patent Publication (DE-AS) No. 1,480,089 discloses such a door, for example, in which the central door member forms a Y-shaped or V-shaped carrier arrangement. These doors have, among others, the advantage that the interior and exterior door components such as door panels may be made of synthetic material without regard to any force transmitting capabilities of these interior and exterior door means. Thus, these interior and exterior door means may be constructed as covering panels exclusively. Such a structure results in a substantial weight reduction but has the disadvantage that the strength of the entire door structure is necessarily reduced. Thus, this type of door cannot normally meet the requirement for a maximum reduction of any dangers to passengers in a motor vehicle resulting from a lateral impact and causing a deformation of such doors.

OBJECTS OF THE INVENTION

In view of the above it is the aim of the invention to achieve the following objects singly or in combination:

to construct a door, especially a vehicle door of the above described type so that its resistance against deformation is increased while simultaneously maintaining the advantage of a synthetic material structure and thus a lightweight structure;

to construct a door in such a manner that it may satisfy the requirements of a fiber compound material construction; and to facilitate the assembly and disassembly of the door components.

SUMMARY OF THE INVENTION

According to the invention a lightweight door structure is characterized in that a central core member which is shearing stress and torsion load resistant is constructed as a large surface area compound synthetic material body which is encased in two shells and which is made of hard foam material in which at least one impact energy absorbing element is embedded.

The central core of the door is thus formed as a double walled intermediate wall structural component of the door which satisfies the stiffness requirements. Simultaneously, the central core member is constructed primarily in the form of a sandwich type structural component acting as an energy absorbing impact buffer. This type of structure satisfies the requirement for a compact construction. Further, by using hard foam material for the central core in which at least one impact energy absorbing element is embedded, for example in the form of a corrugated plate, it is assured that the central portion of the door is provided with a maximum energy absorbing capability. Preferably the corrugated plate extends in the central door plane in the embedding hard foam material. The energy absorbing capability is optimized because the hard foam core has a tendency to counteract any tendency of the corrugated plate to change its form, especially in the longitudinal direction. This counteraction even increases the shock absorbing tendency.

BRIEF FIGURE DESCRIPTION

In order that the invention may be clearly understood, it will now be described, with reference to the accompanying drawing in which the single FIGURE shows an exploded view of a door structure according to the invention.

DETAILED DESCRIPTION OF A PREFERRED EXAMPLE EMBODIMENT AND OF THE BEST MODE OF THE INVENTION

The shown example embodiment illustrates a front door for a passenger car. The door means comprise interior and exterior door components. Only the interior door component 1 is shown. The door further comprises a central door component 2 shown partially broken away. An outer door panel may conventionally be secured in the form of a mere metal skin to the central door component 2. The central door component 2 also constitutes a carrier for the interior door component 1 which may simultaneously act as an interior door covering and which is provided with guide rails 1.1, for example for a door window and the like. The interior door component 1 may be heat molded and made of synthetic material which may be fiber reinforced if desired, for example with glass fibers.

The central door component 2 is the only self-supporting component of the door. The door component 2 is constructed for insertion into the interior door component 1. For this purpose the central component 2 forms a plate which is provided with vertically extending side brackets 2.1 equipped with tongues 2.2 arranged for cooperation with grooves 1.2 in the interior door component 1. Thus, the interior central door component 2 in the form of a plate can be slid into the grooves 1.2. The door hinges 3 extend through respective holes in the component 1 and into pockets 4 of the central component 2, whereby the door hinges 3 act as arresting means for preventing a relative movement of the components 1 and 2. Thus, the central plate type component 2 forms with the door hinges 3 and with the door lock (not shown) a direct connection which is resistant or stiff against shearing stress and torsion loads.

For this purpose the central door component 2 comprises two shells 2.3 which are preferably made of a fiber webbing such as a glass fiber webbing in which the orientation of the fibers is arranged in a ±45° crossover relationship. The fibers are embedded in a synthetic resin matrix. The two shells 2.3. encase a core 2.4 made of a hard foam material, for example polyurethane. A corrugated plate 2.5 is embedded in the hard foam material of the core 2.4. The corrugated plate 2.5 acts as an energy absorbing body especially an impact energy absorbing body. One or both shells 2.3 may be provided with a depression for receiving the hard foam core 2.4. Depending on the thickness of the hard foam core or on the size of the amplitude of the corrugation in the inner plate 2.5, one may provide one or both of the shells 2.3 with a respective depression. The corrugated plate 2.5 is also made of a synthetic material or synthetic resin reinforced by embedded fibers. The fiber orientation of the fibers in the plate 2.5 may be such that the fibers extend in a 0°/90° cross-over relationship with reference to the direction of the corrugations. In other words, if the corrugations extend vertically as viewed, there are fibers extending horizontally and fibers extending vertically. The shells 2.3 are intimately bonded to the hard foam core 2.4, for example by means of an adhesive.

The central energy absorbing corrugated plate 2.5 is also intimately bonded to the hard foam core material 2.4. Thus, the central component 2 of the door constitutes an energy absorbing impact buffer when the door is exposed to a crash. Depending on the strength of the impact, the central component 2 will initially bend, whereupon the shells 2.3 may break, if desired along a predetermined line which may be established by a slot or the like to form a rated breaking zone. When the shells 2.3 break, the corrugated plate 2.5 will be lengthened, whereby the hard foam core material 2.4 will crumble. Thus, the central door component 2 takes up impact or shock energy in two ways, namely by two different non-reversible deformations in the form of the lengthening of the plate 2.5 and in the form of the crumbling of the hard foam material of the core 2.4.

In view of the above the present door contributes substantially to a lightweight structure in passenger vehicles to save fuel without the need for accepting a larger safety risk for the passengers. Furthermore, this type of structure satisfies well the requirements which must be met in connection with so-called fiber compound material structures.

Although the invention has been described with reference to specific example embodiments, it will be appreciated, that it is intended, to cover all modifications and equivalents within the scope of the appended claims.

What is claimed is:

1. A door especially for a motor vehicle, comprising an interior door means, and a central shearing stress and torsion load resistant core member of hard foam material having a larger surface area relative to said interior door means, two shells encasing said central core member, at least one impact energy absorbing element embedded in said central core member of hard foam material, and means operatively securing said central core member to said door means, whereby the central core member extends substantially from one edge of the door to the opposite edge of the door.

2. The door of claim 1, wherein said impact energy absorbing element comprises a corrugated plate extending inside said central core member substantially in a central plane of the door.

3. The door of claim 1 or 2, wherein said impact energy absorbing element and said two shells are made of fiber reinforced synthetic material.

4. The door of claim 3, wherein said fiber reinforced synthetic material comprises a fiber webbing embedded in a synthetic resin matrix.

5. The door of claim 3, wherein said two shells have a fiber orientation arranged in a ±45° cross-over relationship, and wherein said impact energy absorbing element has a fiber orientation arranged in a 0°/90° cross-over relationship.

6. The door of claim 1, wherein said securing means comprise first connecting elements forming part of said interior door means and second connecting elements forming part of said encasing shells, said first and second connecting elements cooperating in securing said central core member to said interior door means in a slide-in manner.

7. The door of claim 6, wherein said first and second connecting elements comprise tongue and groove means for said slide-in cooperation.

* * * * *